US012080128B2

(12) United States Patent
Schreiber

(10) Patent No.: US 12,080,128 B2
(45) **Date of Patent: *Sep. 3, 2024**

(54) ELECTRONIC GAMING MACHINE AND METHOD FOR PROVIDING A PLURALITY OF GAME OUTCOMES AND EVALUATING PATTERNS OF GAME OUTCOMES TO PROVIDE ADDITIONAL AWARDS

(71) Applicant: Aristocrat Technologies Australia Pty Limited, North Ryde (AU)

(72) Inventor: Michael Schreiber, Spring Hill, TN (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,749

(22) Filed: May 18, 2023

(65) Prior Publication Data

US 2023/0290226 A1 Sep. 14, 2023

Related U.S. Application Data

(63) Continuation of application No. 17/392,922, filed on Aug. 3, 2021, now Pat. No. 11,699,326, which is a (Continued)

(51) Int. Cl.
*G07F 17/32* (2006.01)

(52) U.S. Cl.
CPC ...... *G07F 17/3267* (2013.01); *G07F 17/3213* (2013.01); *G07F 17/3244* (2013.01); *G07F 17/3293* (2013.01)

(58) Field of Classification Search
CPC ............. G07F 17/3267; G07F 17/3213; G07F 17/3244; G07F 17/3293

(Continued)

(56) References Cited

U.S. PATENT DOCUMENTS

| | | | | |
|---|---|---|---|---|
| 5,393,057 | A | 2/1995 | Marnell, II | |
| 10,102,711 | B2 * | 10/2018 | Zoltewicz | G07F 17/3267 |

(Continued)

OTHER PUBLICATIONS

Office Action dated Dec. 1, 2020 for U.S. Appl. No. 16/577,722 (pp. 1-8).

(Continued)

*Primary Examiner* — Pierre E Elisca

(74) *Attorney, Agent, or Firm* — Armstrong Teasdale LLP

(57) ABSTRACT

An electronic gaming machine includes a processor configured to control a display device to display a matrix of game positions, initiate a plurality of games, and control the display device to display each game of the plurality of games in an associated game position of the matrix of game positions. The processor is also configured to determine an outcome of each game, where each outcome is a qualifying outcome or a non-qualifying outcome, as well as to evaluate the matrix of game positions to determine whether a qualifying pattern is formed in the matrix by at least two qualifying outcomes. In response to the qualifying pattern being formed, the processor is also configured to provide an award to a player of the electronic gaming machine. Each outcome may be individually evaluated to provide one or more additional awards to the player as well.

20 Claims, 8 Drawing Sheets

Related U.S. Application Data continuation of application No. 16/577,722, filed on Sep. 20, 2019, now Pat. No. 11,094,169.

(58) Field of Classification Search
USPC ........................................................ 463/20
See application file for complete search history.

(56) References Cited

U.S. PATENT DOCUMENTS

| | | | | |
|---|---|---|---|---|
| 2012/0270627 | A1 | 10/2012 | Kaminkow | |
| 2014/0087821 | A1* | 3/2014 | Zoltewicz | G07F 17/326 463/20 |
| 2014/0162751 | A1* | 6/2014 | Ryan | G07F 17/3267 463/20 |
| 2014/0370957 | A1 | 12/2014 | Hadida | |
| 2015/0080099 | A1* | 3/2015 | Nicely | G07F 17/3274 463/20 |
| 2016/0364945 | A1* | 12/2016 | Zoltewicz | G07F 17/326 |
| 2017/0000467 | A1 | 1/2017 | Hibner | |
| 2017/0004674 | A1* | 1/2017 | Caputo | G07F 17/3213 |
| 2017/0256127 | A1* | 9/2017 | Zoltewicz | G07F 17/3244 |
| 2019/0378378 | A1* | 12/2019 | Bolling, Jr. | G07F 17/3262 |

OTHER PUBLICATIONS

Notice of Allowance dated Apr. 20, 2021 for U.S. Appl. No. 16/577,722 (pp. 1-10).
Office Action (Non-Final Rejection) dated Sep. 21, 2022 for U.S. Appl. No. 17392,922 (pp. 1-6).
Office Action (Notice of Allowance and Fees Due (PTOL-85)) dated Feb. 21, 2023 for U.S. Appl. No. 17/392,922 (pp. 1-8).

* cited by examiner

ELECTRONIC GAMING MACHINE AND METHOD FOR PROVIDING A PLURALITY OF GAME OUTCOMES AND EVALUATING PATTERNS OF GAME OUTCOMES TO PROVIDE ADDITIONAL AWARDS

CROSS-REFERENCE TO RELATED APPLICATION

This application is a continuation and claims the benefit of U.S. patent application Ser. No. 17/392,922, filed Aug. 3, 2021, entitled "ELECTRONIC GAMING MACHINE AND METHOD FOR PROVIDING A PLURALITY OF GAME OUTCOMES AND EVALUATING PATTERNS OF GAME OUTCOMES TO PROVIDE ADDITIONAL AWARDS", which is a continuation and claims the benefit of U.S. patent application Ser. No. 16/577,722, filed Sep. 20, 2019, issued as U.S. Pat. No. 11,094,169 on Aug. 17, 2021, entitled "ELECTRONIC GAMING MACHINE AND METHOD FOR PROVIDING A PLURALITY OF GAME OUTCOMES AND EVALUATING PATTERNS OF GAME OUTCOMES TO PROVIDE ADDITIONAL AWARDS", which is hereby incorporated by reference in its entirety.

TECHNICAL FIELD

The field of disclosure relates generally to electronic gaming, and more particularly, to electronic gaming machines and methods for providing one or more pluralities of game outcomes in a matrix of game positions and evaluating patterns of game outcomes in the matrix to provide one or more additional game awards.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Conventional reel-based wagering games thus provide an award to a player based upon one or more combinations of symbols along predetermined paths, or paylines, drawn through the matrix indicate the outcome of the game. Typically, however, only a single set of reels are evaluated, and no secondary or bonus award is determined based upon a plurality of independently generated reel outcomes. In addition, conventional games do not evaluate patterns of reel and other Class II and Class III game outcomes to provide additional bonus and other prizes, nor are such prizes typically aggregated with a plurality of sub-prizes provided in a plurality of reel games contributing to one or more bonus patterns. More generally, conventional wagering games simply fail to provide a structure in which many (e.g., tens or even hundreds) of awards may be provided and aggregated to a player's credit balance as a result of a single (or in some cases multiple) wagers.

SUMMARY

In one aspect, an electronic gaming machine is described. The electronic gaming machine includes a display device, a memory, and a processor. The processor is configured to control the display device to display a matrix of game positions, where the matrix includes a plurality of rows and a plurality of columns. The processor is also configured to initiate a plurality of games, where each game of the plurality of games is one of: i) a reel game that includes a simulated plurality of spinning reels, or ii) a poker game that includes a simulated hand of poker. In addition, the processor is configured to control the display device to display each game of the plurality of games in an associated game position of the matrix of game positions, determine an outcome of each game of the plurality of games, where each outcome is a qualifying outcome or a non-qualifying outcome, and evaluate the matrix of game positions to determine whether a qualifying pattern is formed in the matrix of game positions by at least two qualifying outcomes of the plurality of games displayed in the matrix of game positions. The processor is also configured to provide an award to a player of the electronic gaming machine in response to the qualifying pattern being formed.

In another aspect, a tangible, non-transitory, computer-readable storage medium is described. The storage medium has instructions stored thereon which when executed by a processor, cause the processor to control a display device to display a matrix of game positions, where the matrix includes a plurality of rows and a plurality of columns. The instructions also cause the processor to control the display device to display a plurality outcomes of a plurality of games, where each outcome is displayed in an associated game position of the matrix of game positions, and where each outcome is a qualifying outcome or a non-qualifying outcome. In addition, the instructions cause the processor to evaluate the plurality of outcomes to determine whether any combination of qualifying outcomes of the plurality of outcomes forms a qualifying pattern in the matrix of game positions, and in response to the qualifying pattern being formed in the matrix of game positions, provide an award to a player. In addition, the instructions cause the processor to evaluate each outcome of each game to determine whether each outcome is a winning outcome, determine an additional award associated with each winning outcome, provide each additional award to the player.

In yet another aspect, a method is described. The method includes controlling a display device to display a matrix of game positions, where the matrix includes a plurality of rows and a plurality of columns. The method also includes controlling the display device to display a plurality randomly determined outcomes of a plurality of games, where each outcome is displayed in a game position of the matrix of game positions, and where each outcome is a qualifying outcome or a non-qualifying outcome. The method also includes evaluating the matrix of game positions to determine whether any qualifying outcome of the plurality of outcomes forms a qualifying pattern in the matrix of game positions. The method includes, in addition, providing an award if at least one qualifying pattern is formed in the matrix of game positions.

BRIEF DESCRIPTION OF THE DRAWINGS

An example embodiment of the subject matter disclosed will now be described with reference to the accompanying drawings.

DETAILED DESCRIPTION

Embodiments are described in which one or more games are played in a matrix of game positions, and in which one or more patterns of outcomes are evaluated to determine whether to provide an additional or bonus award to a player. For example, in some embodiments, each game position displays a reel game, and each reel game generates an outcome in a respective game position. The outcomes of each reel game are evaluated to determine whether a pattern (e.g., a horizontal, vertical, diagonal, or shaped pattern) may be formed from one or more qualifying outcomes in the game positions of the matrix. If one or more patterns are formed, an additional or bonus award may be provided to a player for one or more patterns.

Figure 1:
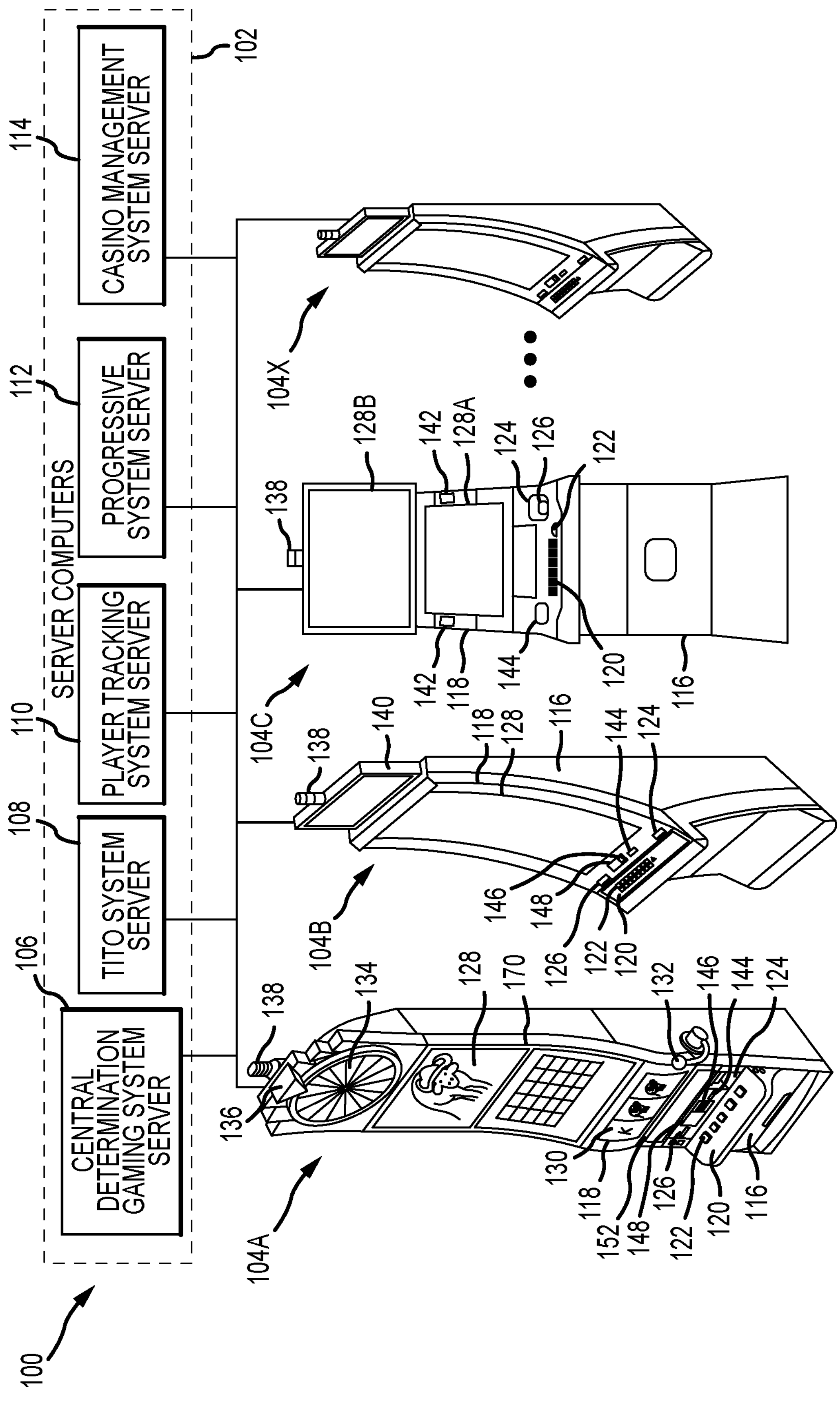
FIG. 1 is an example diagram showing several EGMs networked with various gaming-related servers.

FIG. 1 illustrates several different models of gaming devices or electronic gaming machines ("EGMs") which may be networked to various gaming related servers. For simplicity, the terms "gaming device" and "electronic gaming machine" or "EGM" may be used herein interchangeably. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
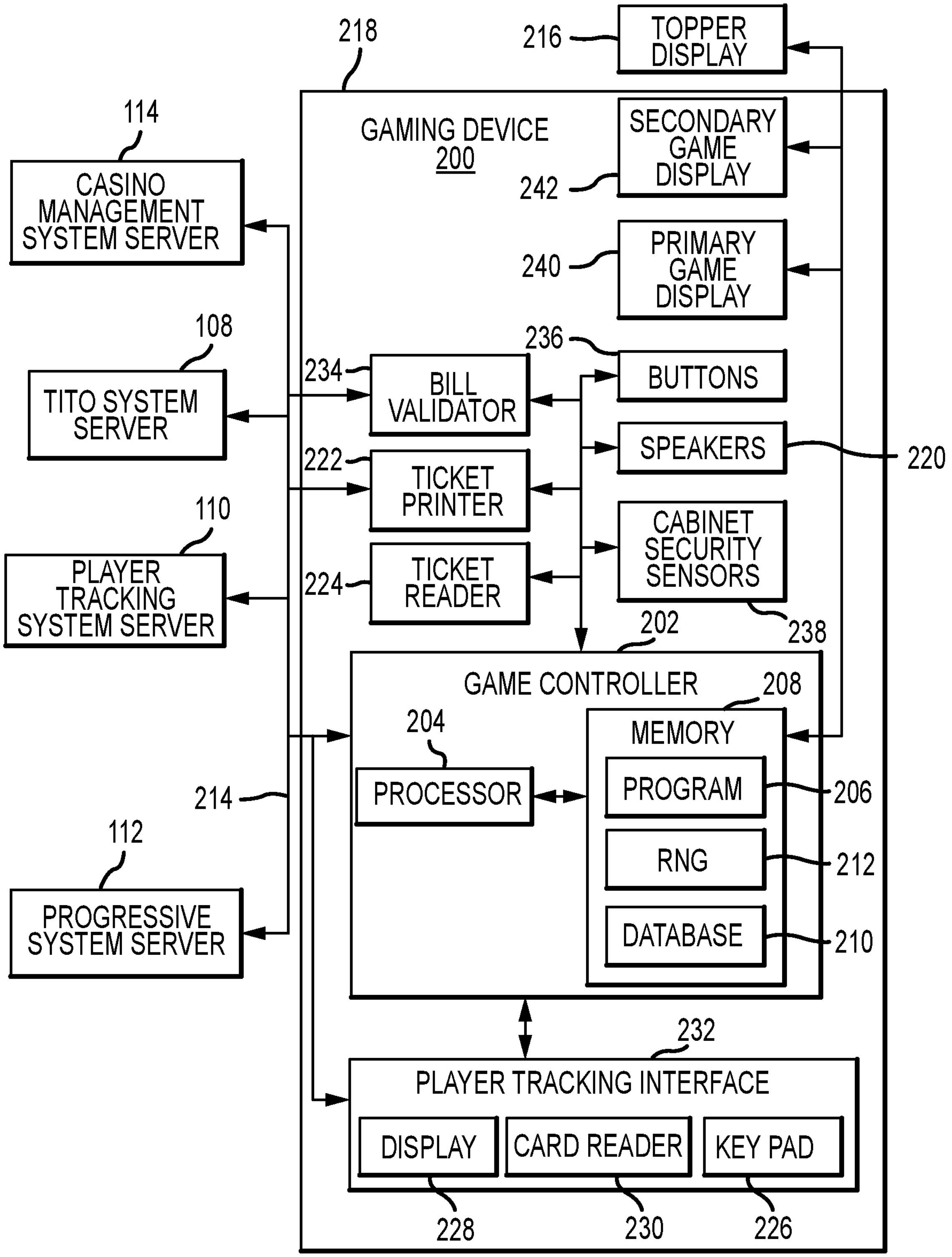
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they facilitate determination of additional or bonus awards based upon patterns formed by winning outcomes displayed in a matrix of game positions. As described herein, at least one technical improvement embodied by the present wagering game is that players may experience or develop a sense of investment and/or equity in a game as the game progresses, such as, for example, as players attempt to create winning patterns in the matrix. These embodiments are thus not merely new game rules or simply a new display pattern, but technical changes to a game mechanic itself, accompanied, in turn, by a variety of technical improvements.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
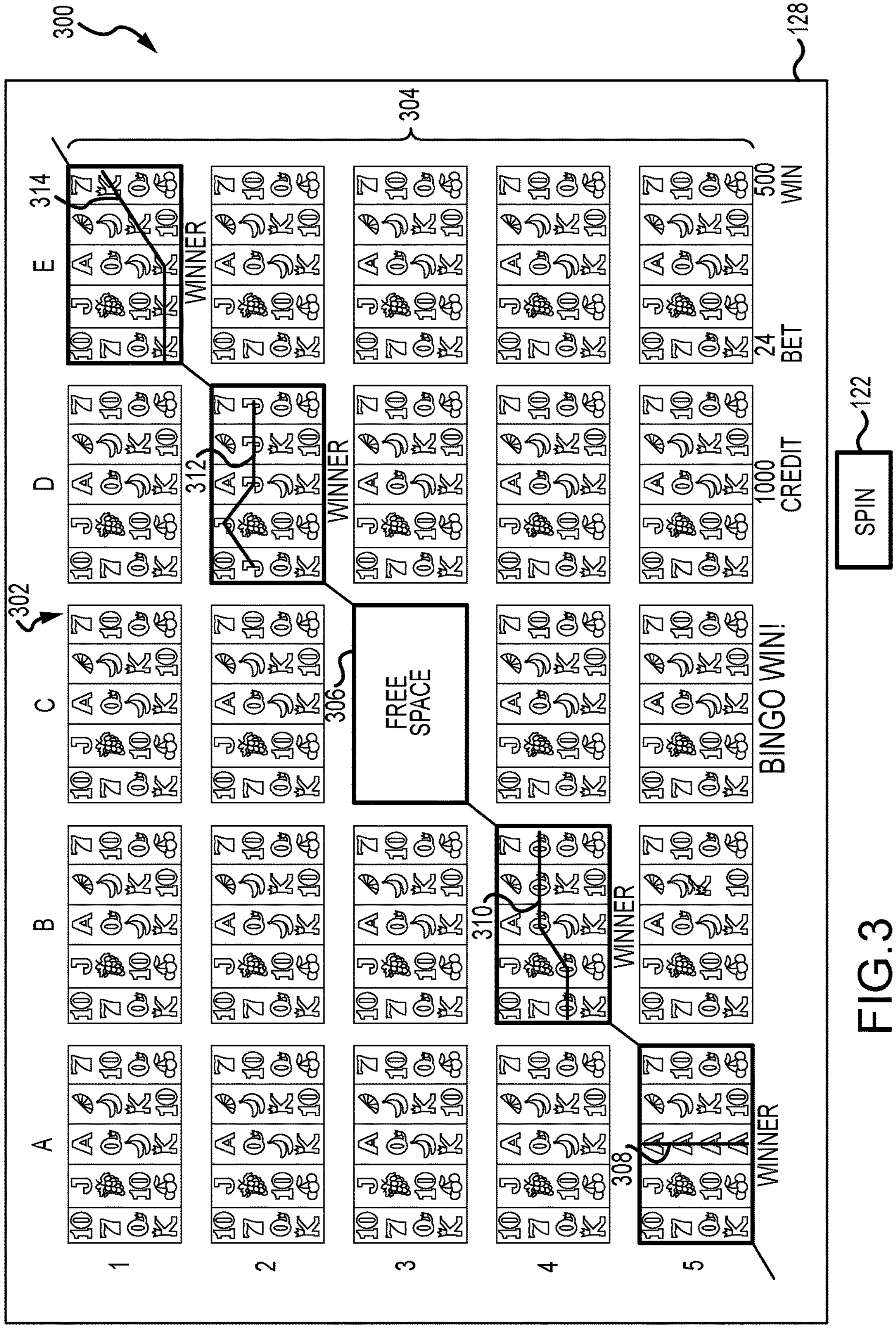
FIG. 3 is a screenshot of a wagering game played on an EGM as shown in FIG. 1 and FIG. 2, in which the wagering game includes a matrix of game positions, and in which one or more games are displayed in one or more game positions of the matrix, and in which a qualifying pattern is formed in the matrix by a combination of games having qualifying outcomes.

FIG. 3 is a screenshot of a wagering game 300 played on an EGM 104A-104X (as shown in FIG. 1 and FIG. 2). Wagering game 300 includes a matrix 302. In turn, matrix 302 includes a plurality of game positions 304 arranged in a plurality of rows and a plurality of columns. As a result, as used herein, matrix 302 may also be referred to as a "matrix of game positions" or a "game position matrix."

In the example embodiment of FIG. 3, matrix 302 is a 5×5 matrix having five rows and five columns. However, in other embodiments, matrix 302 may be any size (e.g., 2×2, 3×3, 4×4, 10×10, etc.) In some embodiments, the number of rows and number of columns of matrix 302 are the same, and in other embodiments these may be different. Each row of matrix 302 is designated by a row number (e.g., "1," "2," "3," "4," "5," etc.) Each column of matrix 302 is designated by a column letter (e.g., "A," "B," "C," "D," "E," etc.)

Each game position of matrix 302 may, as a result, be designated by a game position identifier comprising a row number (e.g., "1," "2," "3," "4," "5," etc.) and a column letter (e.g., "A," "B," "C," "D," "E," etc.) For example, the upper-left-most game position, occurring at the intersection of row 1 and column A, may be designated by the game position identifier "1A."

In the example embodiment, a free game position 306 at game position identifier "3C" (e.g., a center position of matrix 302) is designated as a "FREE SPACE." As described in greater detail below, free game position 306 may not be populated, during gameplay, by a game. Rather, in at least some embodiments, free game position 306 may treated, during an award evaluation process, as a game position having or displaying a qualifying or winning outcome.

Further, although free game position 306 is shown at a center position of matrix 302, in other embodiments, free game position 306 may appear anywhere in matrix 302. Similarly, although only a single free game position 306 is shown, in other embodiments, any number of free game positions may be included in matrix 302. With the inclusion of free game position 306, matrix 302 may simulate or otherwise emulate an appearance of a bingo card. As described in greater detail herein, matrix 302 may be evaluated in a manner similar to a bingo card to provide an award (e.g., an additional or bonus award) to a player.

In various embodiments, one or more game positions of matrix 302 may include or display a game, such as a reel game, a poker game, and/or any other wagering game, such as any other suitable Class II or Class III wagering game. Each game displayed in a game position of matrix 302 may be initiated and/or executed (e.g., by processor 204) to generate a random game outcome, and each randomly generated game outcome initiated, executed, and/or displayed within matrix 302 may be a qualifying outcome or a non-qualifying outcome. During gameplay, matrix 302 may thus include a plurality of independently executed games, each providing a qualifying or non-qualifying outcome.

As used herein, a "qualifying outcome" may include any outcome that may be used, as described herein, in the formation of a "qualifying pattern" within matrix 302, where a qualifying pattern may refer to any pattern of qualifying outcomes associated with an award and/or that may be otherwise used to provide a benefit or another game feature to a player. For example, in at least some embodiments, a qualifying outcome may include a winning outcome, where a winning outcome may be determined by comparing the outcome to a paytable of qualifying or winning outcomes. Similarly, in some embodiments, qualifying outcomes may include any winning outcome associated with an award greater than a threshold award value. In some embodiments, a qualifying outcome may also include an outcome that includes certain symbols, such as three or more of a particular symbol (e.g., three or more cherry symbols, etc.) In addition, in at least some embodiments, a qualifying outcome may include a same or matching outcome of a plurality of (e.g., grouped) games in a plurality of game positions within matrix 302, one or more scatter symbols, and the like.

In the example embodiment, one or more game positions of matrix 302 (with the exception of free game position 306) displays a reel game that includes a plurality of simulated reels (e.g., one, two, three, four, or five reels), each of which may be spun and stopped during execution of the reel game within the associated game position to display an independent and random game outcome. As a result, in at least one embodiment, each game position (and/or each selected game position, as described herein) may display a qualifying or non-qualifying (e.g., winning or non-winning) outcome of an associated reel game.

The specific manner by which qualifying and non-qualifying combinations of symbols are determined and displayed in a Class III game (e.g., a Class III reel game) is not central to an understanding of the present disclosure. However, in general terms, it will be appreciated that each reel of each reel game displayed and executed within matrix 302 may be simulated to spin and stop, whereupon a plurality of symbols from each reel may be evaluated against a paytable of qualifying symbol combinations to determine whether one or more qualifying outcomes are displayed by the reels of each reel game.

In at least some embodiments, fewer than all game positions 304 of matrix 302 may be selected to display an associated game. For example, in at least one embodiment, a number of games to be displayed may be determined, such as by processor 204, based upon a value of a wager or wager input, where the value of the wager may be specified by a player of wagering game 300 via the touchscreen interface or player-input buttons 236.

More particularly, a player of wagering game 300 may specify a wager using a player-input button 236, such as a "Bet" button, and the value of the wager may be used to determine a number of games to be displayed in game positions 304 of matrix 302. Stated another way, a player may purchase a number of games to be displayed in matrix 302, and the number of games purchased may range from zero games to a number of games equal to all game positions 304 of matrix 302.

Accordingly, a number of games to be initiated, executed, and displayed in matrix 302 may increase and decrease as the value of the wager increases or decrease. This may be linear (i.e., proportional) or non-linear (i.e., for a minimum wager amount, a predetermining number of minimum games may be initiated, and any increase in wager amount may increase the number of games to be initiated by a predetermined number, such as 1). A player may increase his or her wager to play a greater number of games in matrix 302. Likewise, the player may decrease his or her wager to play fewer games in matrix 302.

As a result, in some cases, matrix 302 may be completely filled with games (e.g., each game position 304 of matrix 302 may include a game). This may occur when a player places a maximum wager or when a player places a wager otherwise sufficient to fill matrix 302 with games. However, in other cases, not all game positions 304 of matrix 302 may be filled with games. Rather, in at least some embodiments, some wagers (e.g., wagers less than a maximum wager) may result in fewer than all game positions 304 of matrix 302 being filled with games.

In various embodiments, matrix 302 may be resized to only show the number of games to be initiated. For example, if a player places a wager sufficient to purchase ten games, matrix 302 may be resized to a 5×2 matrix or a 4×4 matrix with 2 positions inactivated. In other embodiments, matrix 302 is not resized, and the games that are not initiated may be indicated inactive, such as by greying out or other visual indicators. In various embodiments, the number of games that can be activated, or wagered on, is based on available matrix configuration options, such as 4 games (corresponding to a 2×2 matrix), 6 games (corresponding to a 3×2 or a 2×3 matrix), 9 games (corresponding to a 3×3 matrix), 12 games (corresponding to a 3×4 or 4×3 matrix), 16 games (corresponding to a 4×4 matrix), 20 games (corresponding to a 4×5 or 5×4 matrix) and so on. In some embodiments, the matrix may also include the free game position 306. Therefore, in the previous examples, the number of games that can be activated would be 3, 5, 8, 11, 15, 19, and so forth. In some embodiments, the free game position 306 may only be provided for certain selected wager amounts (that correspond to certain number of activated games, such as for a 3×3 matrix, 5×5 matrix, etc).

When a player places a wager that causes fewer than all game positions 304 of matrix 302 to display a corresponding game, processor 204 may randomly determine which game positions 304 of matrix 302 will include a game in response to receiving the player wager. For example, if a player places a wager sufficient to purchase ten games, ten game positions of matrix 302 may be randomly filled with a respective game outcome.

In another embodiment, a player may use an interface (e.g., a touchscreen or pushbutton interface) of an EGM 104A-104X to select the game positions within matrix 302 that the player wishes to be filled or populated by games. For instance, if the player places a wager sufficient to purchase fifteen games, the player may physically or manually select (e.g., by touching) fifteen game positions of matrix 302 to be populated by the purchased number of games.

As shown with continuing reference to FIG. 3, in the example embodiment, the player has placed a wager sufficient to purchase games for all game positions 304 of matrix 302. As a result, in the illustrated embodiment, each game position 304 of matrix 302, with the exception of free game position 306, includes and displays a game. As described above, each game is a reel game, and each reel game includes a simulated plurality of reels, which may be spun and stopped to display an associated outcome of each game in matrix 302. In various embodiments, each game in the matrix may be the same base game. In various embodiments, each game may be selected from a group of available base games (randomly, in a predetermined manner, or by the player).

In other words, each time the player places a wager, a number of games corresponding to the wager are displayed in associated game positions 304 of matrix 302, and processor 204 executes each game displayed within matrix 302 to display an associated outcome of each game. Each outcome is either qualifying or non-qualifying (e.g., based upon evaluation by processor 204 of each outcome against a paytable corresponding to that game). In the paytable, and as described herein, at least some qualifying outcomes may correspond to game awards.

As a result, matrix 302 may, after execution of a plurality of games, display any number of qualifying outcomes and/or any number of non-qualifying outcomes, where at least some qualifying outcomes displayed in matrix 302 may be associated with a respective game award. For example, in at least some embodiments, if a qualifying outcome includes a winning outcome, the winning outcome may be associated with an individual game award. Each award may, in addition, be added to a credit balance of the player. For example, if a player places a wager that is enough to purchase ten games, and five of the ten games have winning outcomes after execution, five game awards, corresponding to each of the five winning outcomes, may be added to the player's credit balance.

In the example illustrated at FIG. 3, qualifying outcomes occur and are displayed in game positions at game position indicators "5A," "4B," "2D," and "1E." In this example the qualifying outcomes are shown as winning outcomes; however, as described herein, a variety of other qualifying outcomes may occur. To indicate that the reel games at these game positions are associated with qualifying outcomes, one or more win lines (or qualifying lines), such as win lines 308, 310, 312, and 314, may be provided, where each win line 308-314 extends through a qualifying combination of symbols in each game. In addition, the word "WINNER" or "QUALIFIER" may also be provided in proximity to each qualifying outcome. Accordingly, in this example, because the qualifying outcomes are also winning outcomes, the player may receive an award associated with each of these four winning reel outcomes.

In addition to adding the awards associated within each qualifying outcome at position indicators "5A," "4B," "2D," and "1E" to the player's credit balance, in at least some embodiments, processor 204 may also evaluate the qualifying outcomes displayed in matrix 302 to determine whether to provide an additional award (e.g., a bonus award) to the player.

Specifically, a pattern (if any) created or formed by the qualifying outcomes displayed at game positions 304 within matrix 302 may be evaluated against a paytable of qualifying patterns to determine whether to provide a bonus award. Patterns stored in the paytable of qualifying patterns may include any of a variety of qualifying patterns and may be customizable or selectable by a gaming machine operator, such as a casino employee or operator. Some examples of qualifying patterns may include, but are not limited to, diagonal patterns, horizontal patterns, vertical patterns, corner patterns (e.g., four corners), blackout patterns (e.g., all game positions 304), patterns including multiple lines (e.g., multiple horizontal, diagonal, or vertical lines), "x-shaped" patterns, outside edge patterns, a variety of unique patterns, such as patterns associated with a shape of an object or patterns giving a visual appearance of a shape of an object (e.g., a hot dog shape, a car shape, etc.), and the like.

More generally, it will be appreciated that many of the qualifying patterns described herein may resemble winning bingo patterns. As a result, although evaluation of the qualifying outcomes displayed in matrix 302 may not require or utilize any Class II (i.e., bingo) game outcome determination mechanism, matrix 302 may nonetheless be evaluated like a bingo card, in that matrix 302 may resemble a bingo card and may trigger an additional or bonus award, as described herein, when a bingo pattern (or a bingo-like pattern) appears within matrix 302.

In the example illustrated at FIG. 3, the qualifying outcomes appearing at game position indicators "5A," "4B," "2D," and "1E" form a diagonal pattern. In the paytable associated with wagering game 300, the diagonal pattern may be included as one of a plurality of qualifying patterns. As a result, in the example embodiment, the player is also provided an additional or bonus award based upon formation of the diagonal pattern of qualifying outcomes at game position indicators "5A," "4B," "2D," and "1E". The award amount may be specified by the paytable of qualifying patterns, as described above, and may be added to the player's credit balance.

Further, in at least some embodiments, the words "BINGO WIN!" may be provided in conjunction with a pattern of qualifying outcomes in matrix 302. However, as described herein, game positions may not be daubed or selected as a result of a Class II outcome determination. Rather, game positions are "daubed," in at least the example embodiment, when a qualifying outcome is provided in an associated game position. Notwithstanding however, in at least one alternative embodiment, the outcome (qualifying or non-qualifying) provided at each game position of matrix 302 may be determined as a result of a plurality of Class II games, each played in association with a respective game position. However, in other embodiments, an outcome at each game position is a result of a Class III game played in each respective position.

In some embodiments, an option to hold or retain one or more qualifying outcomes in matrix 302 may be provided to a player. This option may be desirable, from a player perspective, in that a player may be provided a greater number of chances to obtain a pattern of qualifying outcomes in matrix 302.

Specifically, a player may hold one or more qualifying outcomes by selecting the game positions corresponding to the qualifying outcomes to be held using an interface, such as a touchscreen interface of main display 128. Following selection of the qualifying outcomes to be held, the player may place an additional wager, which, as described herein, may control a number of additional or subsequent games that are played in game positions of matrix 302. The additional or subsequent games may be initiated, executed, and displayed in any game positions, except for game positions previously held by the player. In some embodiments, the game positions that contain the qualifying outcome may be automatically held for one or more subsequent plays without player input.

In some embodiments, a player may not be required to purchase additional or subsequent games. Rather, in at least some embodiments, a player may be awarded one or more free spins, such as, for example, based upon the occurrence of one or more "scatter" symbols, one or more other special symbols, randomly, and/or based on one or more predetermined outcomes in a game played within matrix 302.

Figure 4:
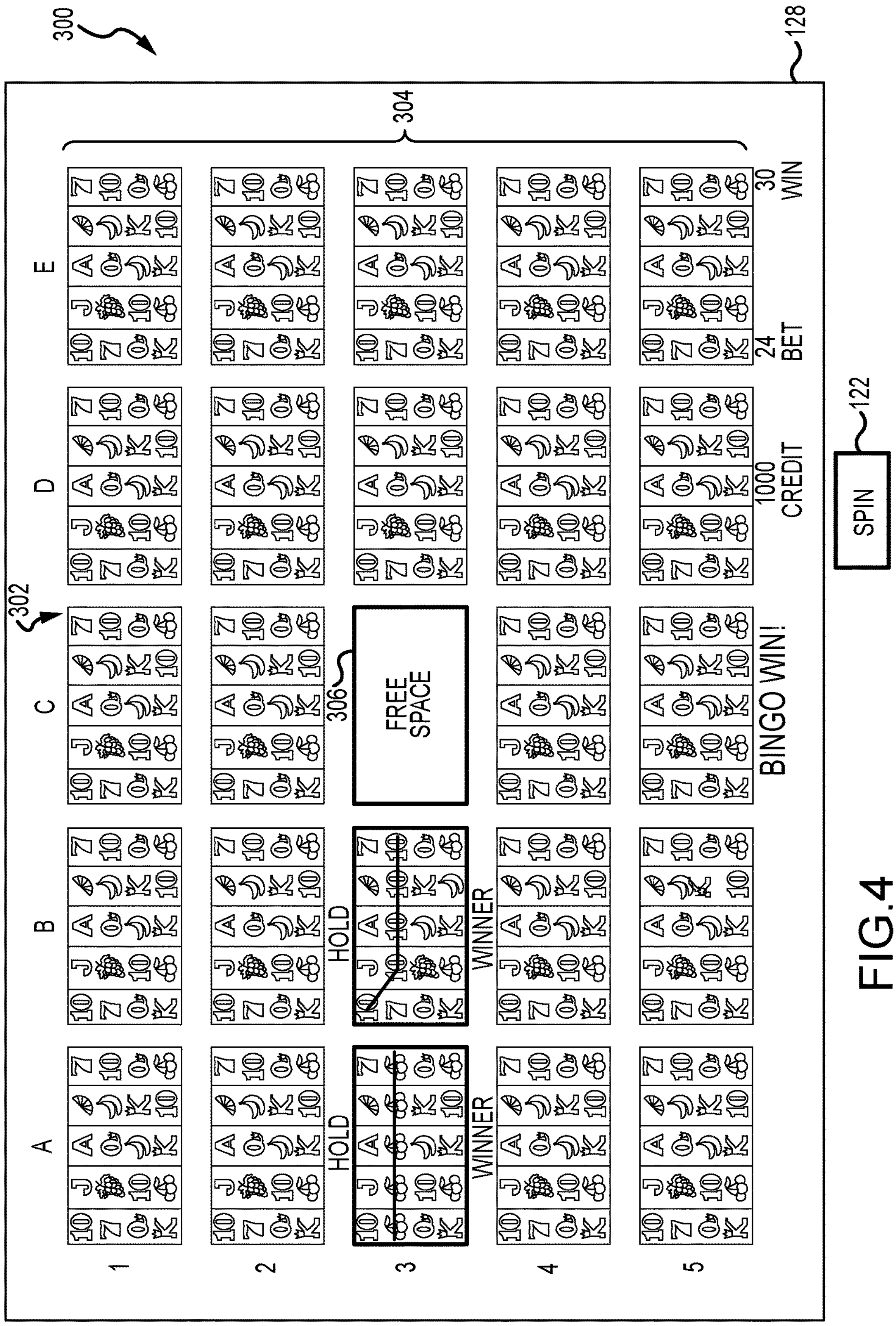
FIG. 4 is a screenshot of the wagering game shown in FIG. 3, in which several qualifying outcomes are held for one or more subsequent games.

Accordingly, FIG. 4 is a screenshot of wagering game 300, in which several qualifying game outcomes are held or retained in game positions in response to a player selection to hold the qualifying outcomes for one or more subsequent games. Specifically, as shown, after a wager and execution of games within matrix 302, the games at game position indicators "3A" and "3B" display qualifying outcomes. The remaining games in matrix 302 display non-qualifying outcomes in this example.

Here, the player selects (e.g., by touching, as described above) the games at game position indicators "3A" and "3B" to cause the qualifying outcomes at these game positions to be held. The word "HOLD" (or similar) may be displayed in conjunction with each player selection at game position indicators "3A" and "3B" to provide a visual indication that the qualifying outcomes at these positions will be held during at least one subsequent game.

Figure 5:
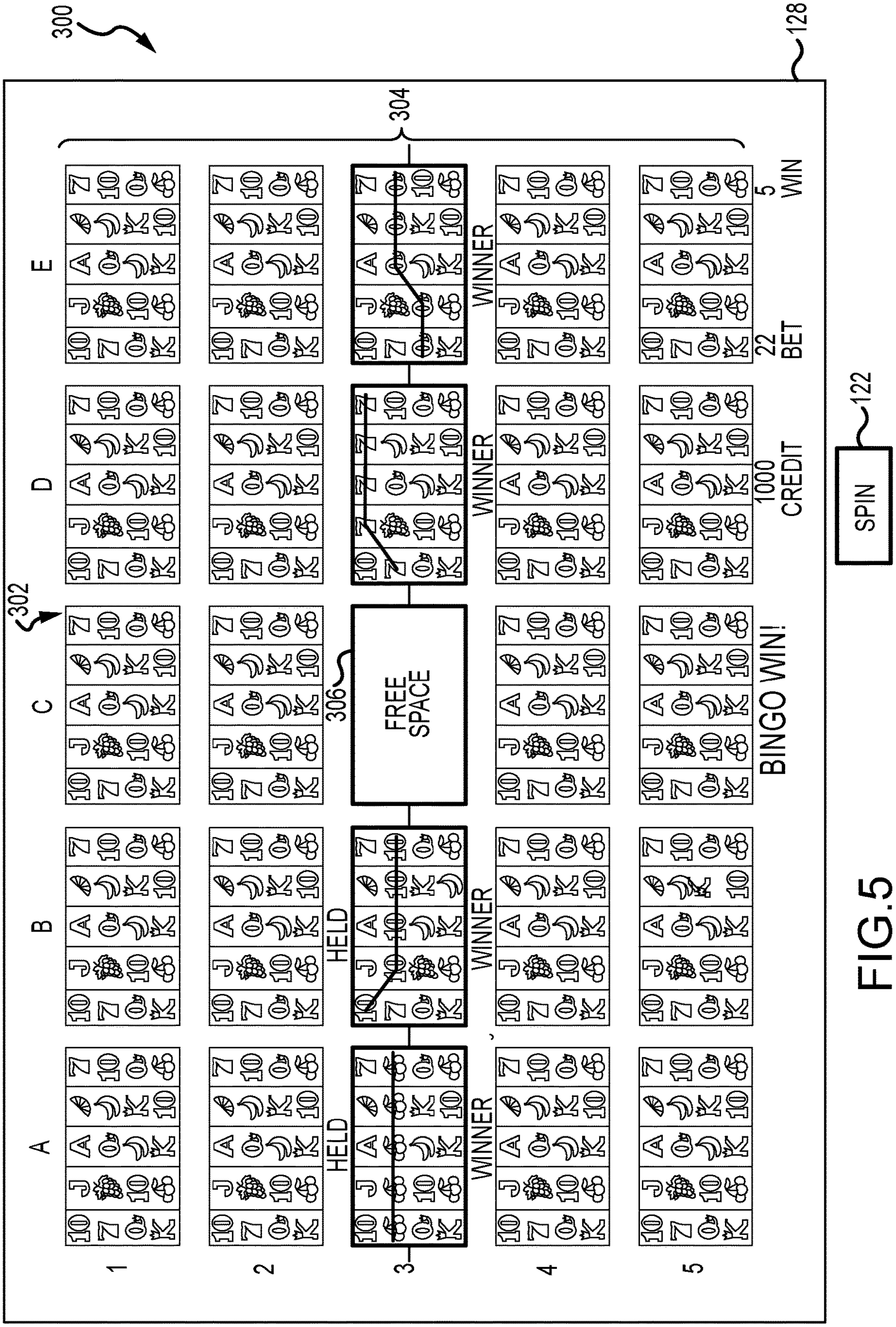
FIG. 5 is a screenshot of the wagering game shown in FIG. 4, in which a qualifying pattern is formed in the matrix by a combination of several previously held qualifying outcomes and several qualifying outcomes of a subsequent plurality of games.

FIG. 5 is a screenshot of wagering game 300, in which a qualifying pattern is formed in matrix 302 by a combination of several previously held qualifying outcomes and several qualifying outcomes of a plurality of subsequent games. Specifically, after at least two subsequent games are executed, qualifying outcomes are shown at game position indicators "3D" and "3E." As a result, processor 204 determines that a qualifying pattern is formed, in conjunction with free game position 306, on the horizontal line extending through game positions at indicators "3A," "3B," "3D," and "3E."

In addition to providing a bonus award for patterns of qualifying outcomes, in some embodiments, processor 204 may evaluate the non-qualifying outcomes displayed in matrix 302 to determine whether to provide one or more additional awards. For example, in at least one embodiment, patterns of non-qualifying (e.g., non-winning) outcomes may be associated with smaller prizes, such as consolation prizes, which may also be added to a player's credit balance.

Although the example described with reference to FIGS. 3-5 focuses on a single qualifying pattern, in many embodiments, many qualifying patterns may be formed within matrix 302 by a plurality of outcomes (such as a plurality of qualifying and/or non-qualifying outcomes). In some embodiments, a bonus award associated with each qualifying pattern formed in matrix 302 may be provided to a player to further increase a player's credit balance. In other embodiments, only a greatest bonus award may be provided to the player, or a subset of the bonus awards generated as a result of a plurality of patterns in matrix 302 may be provided.

At least one technical improvement embodied by wagering game 300 is that players may experience or develop a sense of investment and/or equity as wagering game 300 progresses, such as, for example, as players attempt to create qualifying patterns in matrix 302 from held and newly added outcomes.

Another technical improvement is that players are able to win many awards, and in different ways, during a single wager as well as over the course of multiple wagers. For example, as described herein, players may win an award for each qualifying outcome provided in matrix 302 (e.g., up to twenty-four independent awards in a 5×5 matrix 302) as well as one or more additional or bonus award provided as a result of one or more qualifying patterns created or formed in matrix 302. Thus, the present wagering game 300 represents a potential for tremendous winnings and is expected, as a result, to generate a good deal of player interest, excitement, enjoyment, and the like.

Further, although the paytable of qualifying patterns described herein and used to determine whether one or more qualifying patterns are formed in matrix 302 may generally resemble a bingo paytable, another unique technical improvement embodied by the present wagering game 300 is the use of the paytable in a different manner and, in at least some embodiments, in a Class III wagering game. Stated another way, the specific technical improvements described herein, and many others, are accomplished in a specific manner through the use of the paytable of qualifying patterns and, indeed, using a specific data structure (again, the paytable).

In addition to reel games, as described in some of the examples above, a variety of other games may be played in game positions 304 of matrix 302. For example, in one alternative embodiment, one or more poker games may be played in one or more game positions 304 of matrix 302. As described herein, poker outcomes may be independently determined for each game position and may use either of a Class II or Class III game implementation.

As above, one or more poker games initiated, executed, and displayed in matrix 302 may be controlled by a player wager, where, for example, a greater number of poker outcomes are generated and/or displayed for larger wagers and a less number of poker outcomes are generated and/or displayed for smaller wagers. Poker outcomes may be randomly determined and may include, for example, five cards. That is, in the example, a five card poker game is played. However, it will be appreciated that other forms of poker (e.g., seven card) may also be implemented.

Accordingly, in at least some embodiments, a plurality of poker outcomes may be generated and displayed in a plurality of game positions of matrix 302. That is, in some embodiments, poker outcomes may be independently generated, similar to the reel game outcomes described above, and populated in associated game positions.

Figure 6:
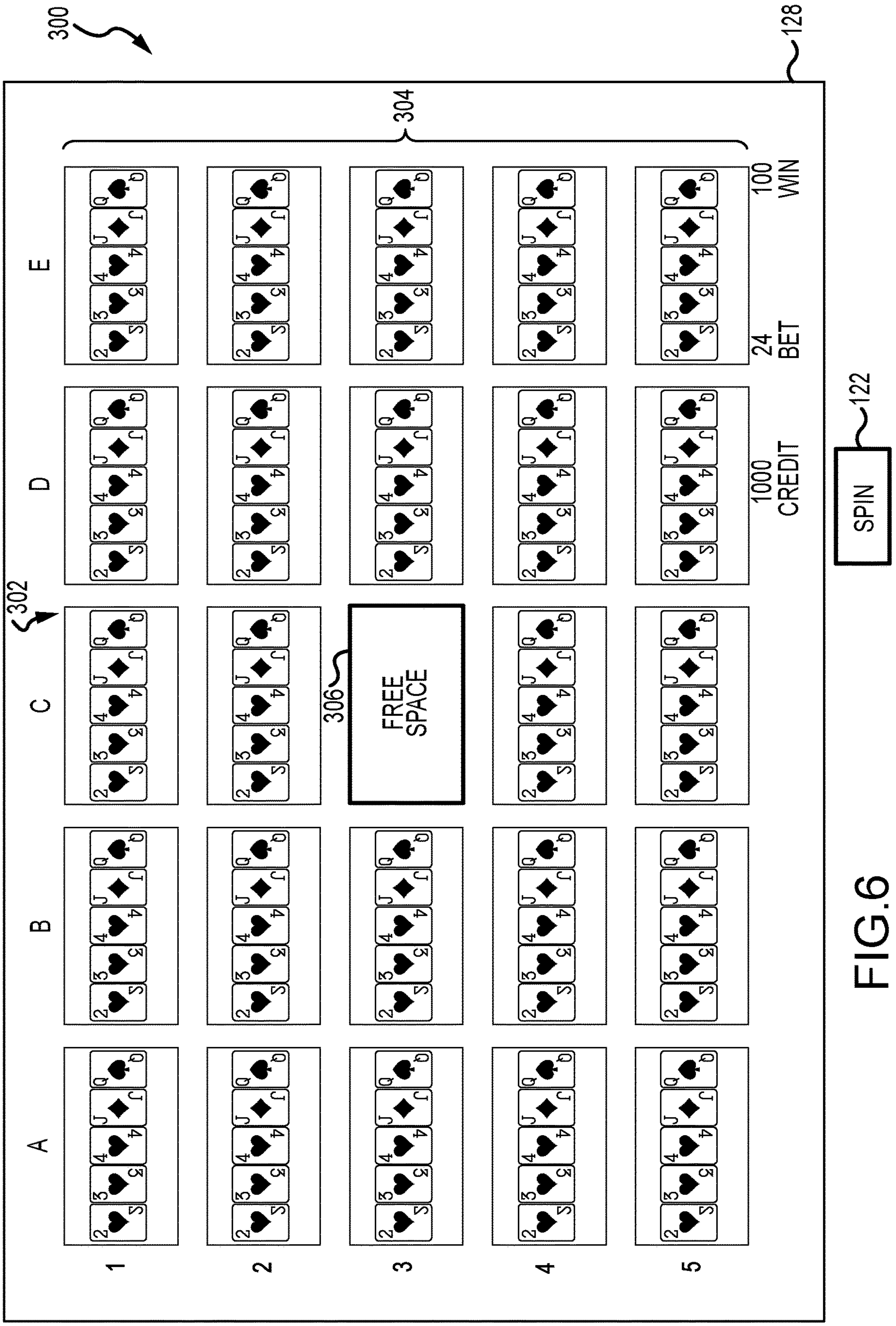
FIG. 6 is a screenshot of the wagering game shown in FIG. 3, in which one or more poker games are played in one or more game positions of the matrix.

However, in other embodiments, a single poker game may be played in a plurality of game positions 304 of matrix 302. FIG. 6 more particularly illustrates such an embodiment. Specifically, in FIG. 6, a single poker game is executed, and the initial hand of the poker game is as follows: 2-Hearts, 3-Hearts, 4-Hearts, J-Diamonds, and Q-Hearts. This (non-winning and non-qualifying) poker hand is displayed in each game position 304 of matrix 302 as a result of a player wager being sufficient to populate all game positions 304 of matrix 302 and/or by default in this embodiment. That is, fewer than all game positions 304 of matrix 302 may be populated in this embodiment with an initial poker hand based upon a value of a player wager and/or all game positions 304 may be populated with the initial poker hand, as shown.

A player may attempt to create a qualifying pattern (e.g., a "bingo" pattern) in matrix 302, as described herein, by discarding one or more cards from the initial poker hand populated in matrix 302. For instance, in the example shown at FIG. 6, the player may select (e.g., using an interface of main display 128 and/or a button 122) one or more cards from the initial poker hand to be discarded. Here, for example, the player selects the J-Diamonds and the Q-Hearts to be discarded from the initial poker hand.

Figure 7:
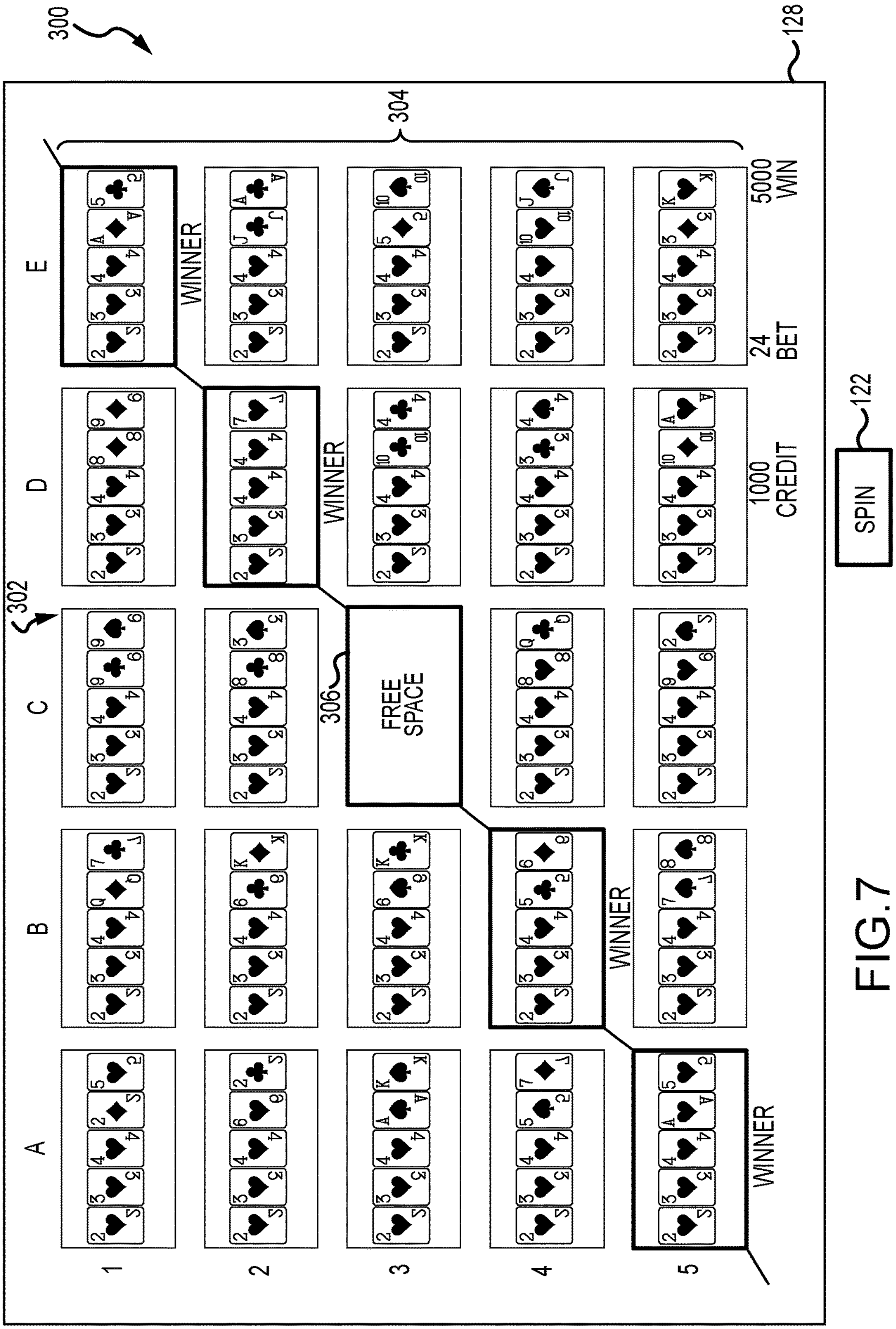
FIG. 7 is a screenshot of the wagering game shown in FIG. 6, in which a qualifying pattern is formed in the matrix by a combination of poker games having qualifying outcomes.

In response to the player selection of cards to be discarded from the initial poker hand, processor 204 randomly selects two replacement cards to create a final poker outcome. FIG. 7 illustrates matrix 302 populated by a plurality of final poker outcomes. Specifically, each game position 304 of matrix 302 includes a final poker outcome. In the example, winning poker outcomes (i.e., winning hands) occur at game positions "5A," "4B," "2D," and "1E." In various embodiments, winning poker hands are also qualifying. However, as described in greater detail herein, in many embodiments, a variety of non-winning poker hands may be treated as qualifying hands or qualifying outcomes.

As a result, a qualifying pattern is formed in matrix 302 on the diagonal that includes game positions "5A," "4B," "2D," "1E," and free game position 306. An award, such as a bonus award, may be provided to the player and added to the player's credit balance in response to creation of the qualifying pattern on the diagonal. In addition, awards associated with each qualifying and/or winning poker hand in matrix 302 may also be added to the player's credit balance.

Figure 8:
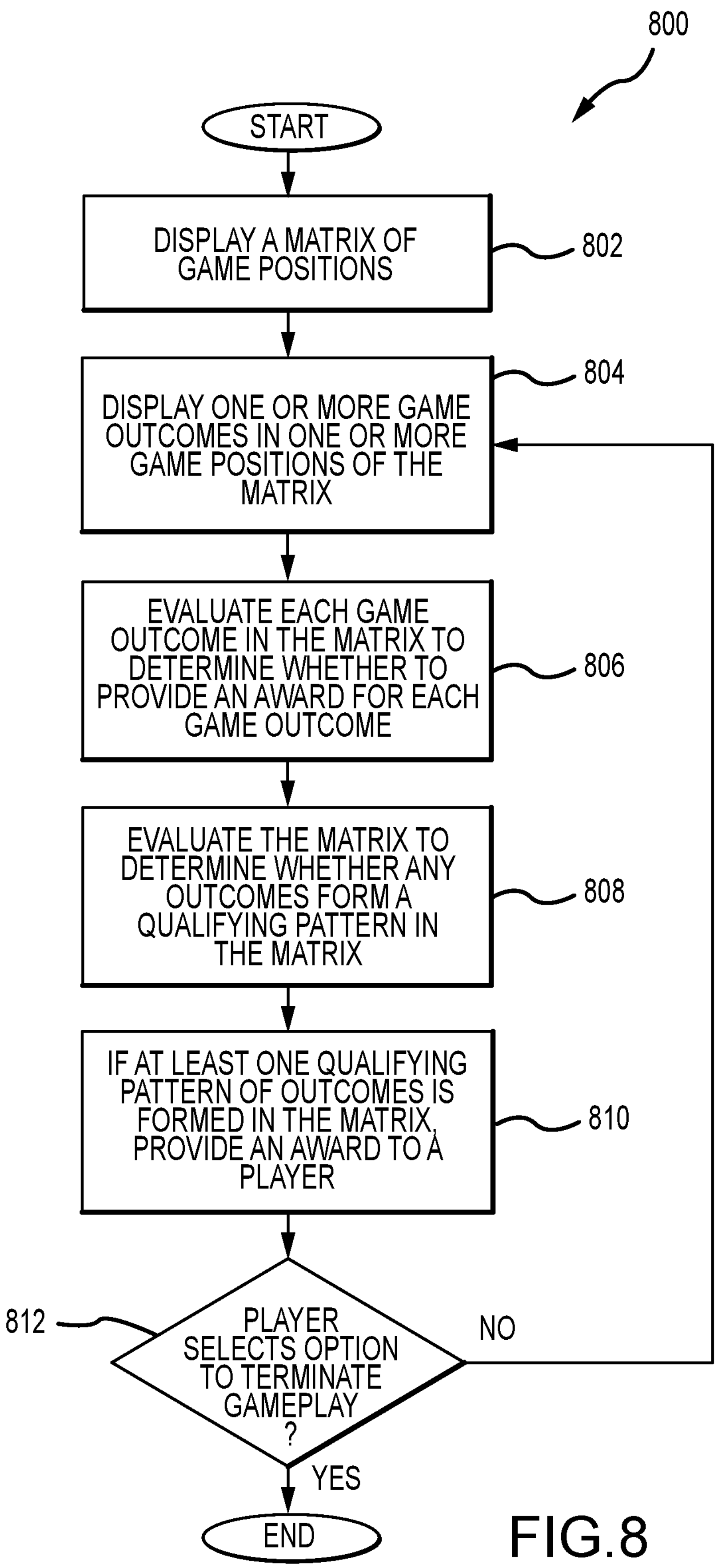
FIG. 8 is a flowchart illustrating a process for playing and evaluating one or more games in one or more game positions of a matrix of game positions, as shown at FIGS. 3-7.

FIG. 8 is a flowchart illustrating and summarizing a process 800 for playing and evaluating one or more games in one or more game positions of matrix 302. Accordingly, matrix 302 may be displayed, such as on main display 128 and/or on any other display of an EGM 104A-104X (step 802). Processor 204 may, in addition, initiate and execute one or more games, such as one or more reel games, one or more poker games, and the like. As described herein, game outcomes may be generated in either or both of Class II and/or Class III implementations. Moreover, in some embodiments, each game position selected to include a game outcome may include an independently generated game outcome (e.g., as in at least one embodiment of a reel game), or each game position selected to include a game outcome may initially include a single or same outcome (e.g., as in at least one embodiment of a poker game).

In response to generating one or more game outcomes, processor 204 may display the one or more game outcomes in one or more game positions, as described herein (step 804). As described herein, outcomes may be qualifying or non-qualifying (including winning or non-winning), and once all outcomes are displayed for a particular wager (or series of wagers), processor 204 may evaluate each outcome in matrix 302 and provide one or more awards associated with each qualifying and/or winning outcome (step 806). Processor 204 may also evaluate the outcomes displayed in matrix 302 to determine whether any outcomes form a qualifying pattern in matrix 302 (step 808). If one or more qualifying patterns are formed, processor 204 may, as described herein, provide one or more additional or bonus awards (step 810). As described herein, in at least one embodiment, processor 204 may also evaluate patterns of non-qualifying or non-winning outcomes to provide one or more awards as well, such as one or more smaller, consolation prizes. Lastly, processor 204 the player is provided an option to terminate wagering game 300 and/or continue gameplay (step 812).

Embodiments are therefore described in which one or more games are played in a matrix of game positions, and in which one or more patterns of outcomes are evaluated to determine whether to provide an additional or bonus award to a player. For example, in some embodiments, each game position displays a reel game, and each reel game generates an outcome in a respective game position. The outcomes of each reel game are evaluated to determine whether a pattern (e.g., a horizontal, vertical, diagonal, or shaped pattern) may be formed from one or more qualifying outcomes in the game positions of the matrix. If one or more patterns are formed, an additional or bonus award may be provided to a player for one or more patterns.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

a display device;

a memory; and a processor configured to execute instructions stored in the memory, which when executed, cause the processor to at least:

cause to be displayed, on the display device, a matrix of game positions, the matrix including a plurality of rows and a plurality of columns;

initiate a plurality of games;

cause to be displayed, on the display device, each game of the plurality of games in an associated game position of the matrix of game positions;

determine an outcome of each game of the plurality of games, each outcome being a qualifying outcome or a non-qualifying outcome;

evaluate the matrix of game positions to determine whether a qualifying pattern is formed in the matrix of game positions by at least two qualifying outcomes of the plurality of games displayed in the matrix of game positions; and in response to the qualifying pattern being formed, provide an award to a player of the gaming device.

2. The gaming device of claim 1, wherein the instructions, when executed, further cause the processor to receive at least one game instance message from a gaming system server, wherein the outcome of each game of the plurality of games is determined based on the at least one gaming instance message.

3. The gaming device of claim 1, wherein the instructions, when executed, further cause the processor to at least:

receive an input from the player of the gaming device;

determine, based upon an input value, a number of games to be initiated, the number defining the plurality of games, wherein the number of games to be initiated increases and decreases based at least in part on the input value; and initiate the plurality of games in response to receiving the input.

4. The gaming device of claim 1, wherein if a number of games to be initiated is less than a number of game positions in the matrix of game positions, and wherein the instructions, when executed, further cause the processor to one of:

receive, from a user interface of the display device, a player selection of the plurality of game positions to display the plurality of games; or randomly select the plurality of game positions to display the plurality of games.

5. The gaming device of claim 1, wherein the instructions, when executed, further cause the processor to at least:

evaluate each outcome of each game to determine whether each outcome is a winning outcome;

determine an additional award associated with each winning outcome; and provide each additional award to the player of the gaming device.

6. The gaming device of claim 1, wherein the instructions, when executed, further cause the processor to at least:

compare at least one pattern formed by the at least two qualifying outcomes of the plurality of games displayed in the matrix of game positions to a paytable of qualifying patterns; and in response to the at least one pattern matching at least one qualifying pattern of the paytable of qualifying patterns, provide the award.

7. The gaming device of claim 1, wherein the instructions, when executed, further cause the processor to at least:

control the display device to display the matrix of game positions as a simulated bingo card;

control the display device to display a free game in a center position of the matrix of game positions, the free game representing a qualifying outcome; and evaluate the matrix of game positions to determine whether the qualifying pattern is formed in the matrix of game positions by the at least two qualifying outcomes and the free game.

8. The gaming device of claim 1, wherein the instructions, when executed, further cause the processor to at least:

generate a plurality of game outcomes for a plurality of games initiated on a gaming device, each outcome being a qualifying outcome or a non-qualifying outcome;

transmit, to the gaming device, at least one game instance message including the plurality of game outcomes;

in response to the qualifying pattern being formed, provide an award to the player of the gaming device.

9. A tangible, non-transitory, computer-readable storage medium having instructions stored thereon, which when executed by a processor, cause the processor to at least:

cause to be displayed, on a display of a gaming device, a matrix of game positions, the matrix including a plurality of rows and a plurality of columns;

cause to be displayed, on the display of the gaming device, a plurality of games initiated on the gaming device, the plurality of games in an associated game position of the matrix of game positions;

determine an outcome of each game of the plurality of games, each outcome being a qualifying outcome or a non-qualifying outcome;

evaluate the matrix of game positions to determine whether a qualifying pattern is formed in the matrix of game positions by at least two qualifying outcomes of the plurality of games displayed in the matrix of game positions; and in response to the qualifying pattern being formed, provide an award to a player of the gaming device.

10. The computer-readable storage medium of claim 9, wherein the instructions, when executed, further cause the processor to transmit at least one game instance message to a gaming device, wherein the outcome of each game of the plurality of games is determined based on the at least one gaming instance message.

11. The computer-readable storage medium of claim 9, wherein the instructions, when executed, further cause the processor to:

receive an input from the player of the gaming device;

determine, based upon an input value, a number of games to be executed, the number defining the plurality of games, wherein the number of games to be executed increases and decreases based at least in part on the input value; and execute the plurality of games in response to receiving the input.

12. The computer-readable storage medium of claim 9, wherein if the number of games to be executed is less than a number of game positions in the matrix of game positions, the instructions, when executed, further cause the processor to one of:

receive, from a user interface of the display device, a player selection of each game position to be used in displaying the plurality of outcomes of the plurality of games; or randomly select each game position to be used in displaying the plurality of outcomes of the plurality of games.

13. The computer-readable storage medium of claim 9, wherein each game of the plurality of games is one of: i) a reel game that includes a simulated plurality of spinning reels, or ii) a poker game that includes a simulated hand of poker.

14. The computer-readable storage medium of claim 9, wherein the instructions, when executed, further cause the processor to at least:

compare any patterns formed by any qualifying outcomes displayed in the matrix of game positions to a paytable of qualifying patterns; and in response to at least one pattern matching at least one qualifying pattern of the paytable of qualifying patterns, provide the award.

15. The computer-readable storage medium of claim 9, wherein the instructions, when executed, further cause the processor to at least:

control the display device to display the matrix of game positions as a simulated bingo card;

control the display device to display a free game in a center position of the matrix of game positions, the free game representing a qualifying outcome; and evaluate the plurality of outcomes, including the free game in the center position, to determine whether the qualifying pattern is formed in the matrix of game positions.

16. A method comprising:

controlling, by a processor, a display device to display a matrix of game positions, the matrix including a plurality of rows and a plurality of columns;

controlling, by the processor, the display device to display a plurality randomly determined outcomes of a plurality of games, each outcome displayed in a game position of the matrix of game positions, each outcome being a qualifying outcome or a non-qualifying outcome;

evaluating, by the processor, the matrix of game positions to determine whether any qualifying outcome of the plurality of outcomes forms a qualifying pattern in the matrix of game positions; and providing, by the processor, an award to a player if at least one qualifying pattern is formed in the matrix of game positions.

17. The method of claim 16, further comprising receiving at least one gaming instance message from a central determination gaming system server, wherein the outcome of each game of the plurality of games is determined based on the at least one gaming instance message.

18. The method of claim 16, further comprising:

receiving, by the processor, an input;

determining, by the processor and based upon an input value, a number of games to be executed, the number defining the plurality of games, wherein the number of games to be executed increases and decreases based at least in part on the input value; and executing, by the processor and in response to receiving the input, the plurality of games to randomly determine the plurality of outcomes.

19. The method of claim 16, wherein each game of the plurality of games is one of: i) a reel game that includes a simulated plurality of spinning reels, or ii) a poker game that includes a simulated hand of poker, the method further comprising:

evaluating, by the processor, each outcome of each game to determine whether each outcome is a winning outcome; and determining, by the processor, an additional award associated with each winning outcome; and providing, by the processor, each additional award to the player.

20. The method of claim 16, further comprising:

comparing, by the processor, any patterns formed by any qualifying outcomes of the plurality of outcomes to a paytable of qualifying patterns; and in response to at least one pattern formed by qualifying outcomes of the plurality of outcomes matching at least one qualifying pattern of the paytable, providing, by the processor, the award.

* * * * *